Dec. 27, 1966 A. C. KORTE 3,294,240
FUEL PUMP AND FILTER ASSEMBLY
Original Filed Dec. 21, 1961 2 Sheets-Sheet 1

INVENTOR.
ALFRED C. KORTE
BY
AGENT

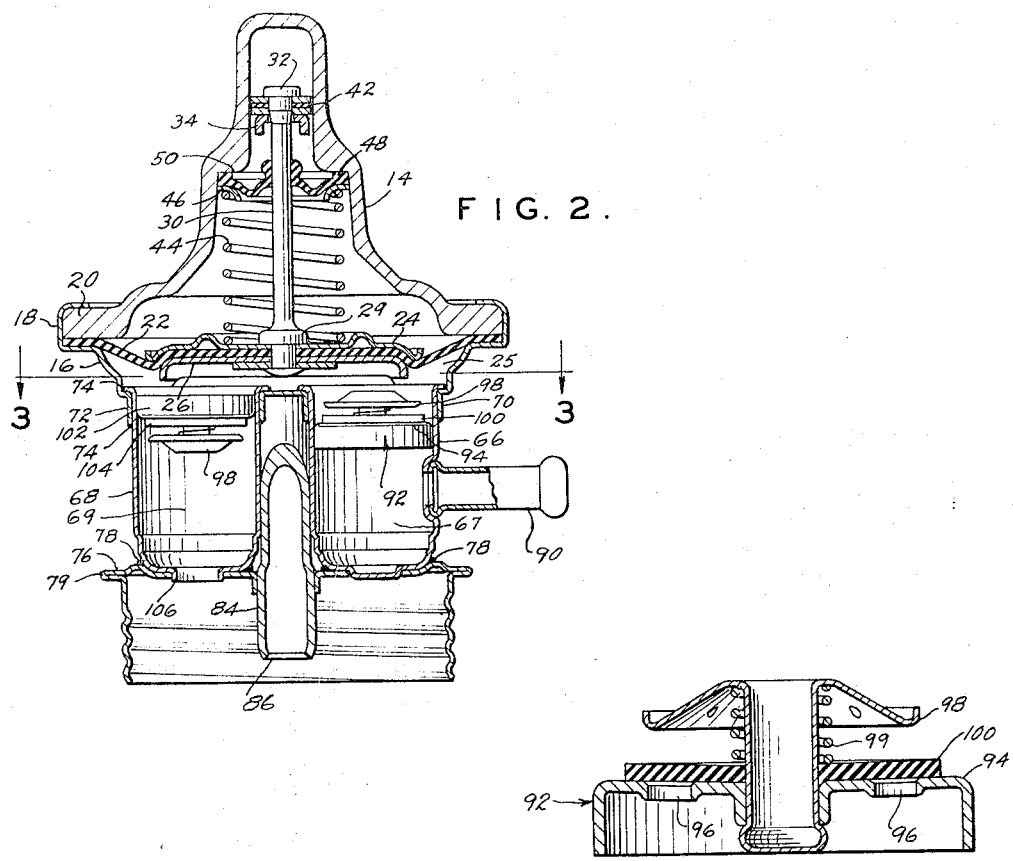

United States Patent Office 3,294,240
Patented Dec. 27, 1966

3,294,240
FUEL PUMP AND FILTER ASSEMBLY
Alfred C. Korte, Jennings, Mo., assignor to ACF Industries, Incorporated, New York, N.Y., a corporation of New Jersey
Continuation of application Ser. No. 161,044, Dec. 21, 1961. This application Dec. 6, 1965, Ser. No. 517,146
7 Claims. (Cl. 210—181)

This is a continuation of my application, Serial Number 161,044 filed December 21, 1961, entitled Fuel Pump, and now abandoned. The present invention relates to a mechanical fuel pump and particularly to a fuel pump design, in which the basic considerations are heat dissipation and cost reduction.

A major problem of fuel pump operation is that of minimizing vapor lock conditions, which occur during the operation of an engine at high ambient temperatures and at high speeds. Such vapor lock conditions also occur during a "soak" period when the engine stands after a prolonged operation at high speed and at a high ambient temperature. The fuel line and fuel pump of the engine are packed closely adjacent to the engine and readily absorb heat from the hot engine parts.

The fuel pump is particularly vulnerable to vapor in the fuel line and its efficiency drops rapidly as vapor is formed in the fuel line or enters the pump. Pumps of this type are conventionally made of cast metal housing structures, which due to their mass and thickness retain heat absorbed from the engine and the hot fuel passing into the pump. It is thus an advantage to utilize a fuel pump that would retain a minimum of heat carried to it during engine operation. It is also desirable that the pump be able to rapidly conduct heat away from the fuel within the pump to minimize vapor formation.

It is therefore an object of this invention to provide a novel fuel pump assembly which minimizes vapor lock conditions.

It is another object of this invention to provide a novel fuel pump assembly which can dissipate heat carried to it by hot fuel or from hot engine parts.

It is a further object of this invention to provide a novel pump and filter assembly which has high heat dissipation properties to minimize vapor lock conditions.

Mechanical fuel pumps made of cast metal housings use an excessive amount of metal alloy and require considerable machining operations. In considering the problem of reducing the cost of fabrication of such pumps, it has been found that sheet metal construction lends itself advantageously for this purpose.

A further object of this invention is to provide a novel design of a fuel pump and filter assembly for the fuel system of an automotive vehicle, which is formed easily of sheet metal to provide a cost reduction in pump fabrication.

Another object of this invention is to provide a novel construction of a fuel pump and filter assembly for the fuel system of an internal combustion engine, in which the integral parts are easily formed of sheet metal and assembled with low most techniques.

This invention is directed to a novel design of a mechanical fuel pump and filter assembly in which heat dissipation is greatly increased by the use of thin walled metal housing structures and in which cost reduction is achieved by the use of shaped sheet metal parts. The fuel filter chamber is joined integrally with the pump housing structure to form a unitary assembly.

FIGURE 2 is a partial sectional view in elevation of the fuel pump of FIGURE 1, without the filter assembly.

FIGURE 3 is a cross section along section line 3—3 of FIGURE 2.

FIGURE 4 is a sectional view of the valve structure of the pump of FIGURES 1–3.

Figure 1:
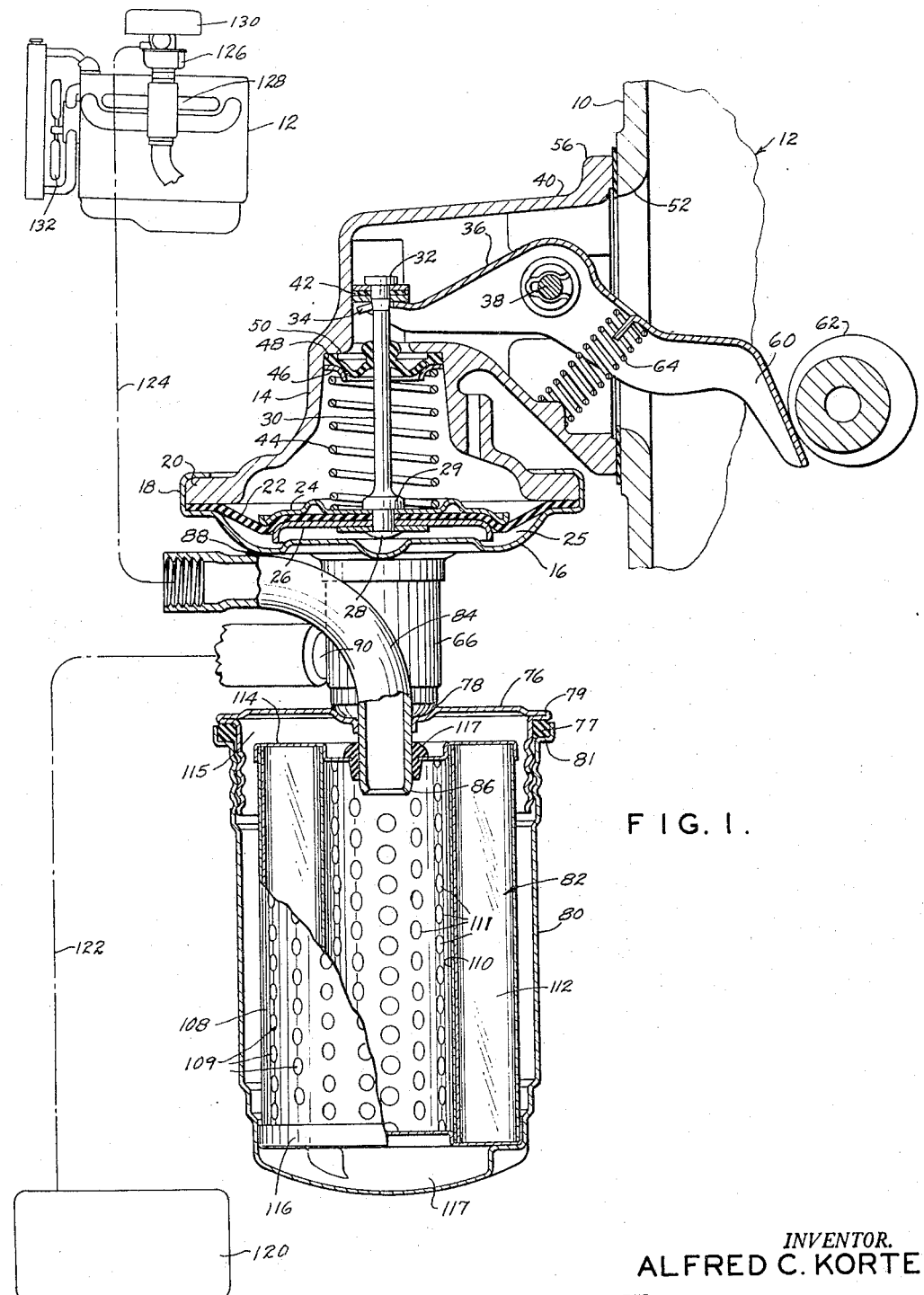
FIGURE 1 is a sectional view in elevation of the novel pump and filter assembly, in accordance with this invention, showing the assembly attached to a portion of an internal combustion engine and with the fuel system of the engine schematically represented.

FIGURE 1 discloses this invention in a sectional view, in elevation, of the pump and filter assembly connected to the crankcase 10 of an internal combustion engine 12. The pump portion of the pump and filter assembly includes a pump spring housing 14 attached to a pump housing portion 16. The pump housing portion 16 is a sheet metal dished plate construction, of iron, or steel, for example, and having a thickness in the order of 0.030". The dished plate 16 has a rim 18 bent up and inwardly over a flange 20 of the spring housing 14. The fastening of the rim 18 over flange 20 is done with sufficient pressure so that the peripheral edge of a circular flexible rubber-coated fabric pump diaphragm 22 is tightly gripped between rim 18 and flange 20. This seals, in a fuel-tight manner, the diaphragm to rim 18. The central portion of the pumping diaphragm 22 is made sufficiently rigid by a pair of backing plates 24 and 26 on opposite sides of the diaphragm 22. The described method of attaching rim 18 to flange 20 eliminates the necessity of using screws through flange 20 which would require a large flange area. Thus, flange 20 is kept to a minimum size permitting the positioning of the pump within a smaller space.

Backing plates 24 and 26 are tightly fixed together with the pumping diaphragm 22 in between by spinning over the end 28 of a pump rod 30 extending through the several parts. This holds the plates and diaphragm between a shoulder portion 29 abutting the surface of plate 24 and the spun-over head portion 28. The other end of rod 30 is formed with a nail head 32 which is fitted into the forked end 34 of an actuating lever 36, which in turn is mounted for pivotal movement on a bearing pin 38 journaled in an extension 40 of the spring housing 14. A flexible noise-suppression wear pad 42 is positioned between the rod head 32 and the forked end 34 of the actuating lever 36. A pump driving spring 44 is positioned between the upper surface of backing plate 24 and a support eyelet 46, which is forced by the spring 44 to tightly seal the peripheral edge of a sealing ring 48 against a shoulder 50 of the spring housing 14. The actuating rod 30 passes through the center of sealing ring 48, which permits reciprocating motion of the rod but fits the rod with sufficient tightness to provide a wiping action. This prevents oil from the crankcase from penetrating into the portion of housing 14 enclosing the spring 44.

Spring housing 14 is fixed across an opening 52 through the wall of the crankcase 10 of the engine 12 and may be attached to the crankcase 10 by fastening the housing to studs extending through the flange portion 56 of housing 14 from the manifold 10. The operating lever 36 has an end 60 extending through the opening 52 into the crankcase of engine 12 and into contact with an engine driven eccentric cam 62, as indicated in FIGURE 1. A spring 64 is tensioned between a portion of the housing extension 40 and the lever arm 36 to hold lever end 60 against cam 62.

During engine operation, the eccentric cam 62 is rotated and causes the pump operating lever 36 to oscillate back and forth. As viewed in FIGURE 1, the upward motion of the rocker arm end 34 pulls the pump rod 30 upwardly and tensions spring 44. Movement of operating lever 36 in a counterclockwise direction permits the spring 44 to press the pump rod and diaphragm 22 downwardly. The space between the housing plate wall 16 and the pump diaphragm 22 forms a pumping chamber 25.

To the bottom of the cup-shaped plate 16 there is attached a pair of tubular cup members 66 and 68 (FIGURE 2) formed of sheet metal such as iron, or steel, in the order of 0.030" thick. The bottom wall of housing plate 16 is formed with a pair of apertures, which are formed with collars 70 and 72 drawn from the metal of the plate 16. Tubular cups 66 and 68 have upper rim portions, as shown in FIGURE 2, which are tightly fitted into the collars 70 and 72, respectively. In this position, the cups 66 and 68 are welded or soldered, as indicated at 74, to the respective collars 70 and 72 to rigidly fix the cups 66 and 68 to the pump housing plate 16.

A filter support structure 76 is formed as a downwardly facing sheet metal cup, as indicated in FIGURES 1 and 2 and formed of iron or steel, for example. The support structure 76 is rigidly attached to the ends of cups 66 and 68 by being placed in abutment with the ends of these cups and ring-soldered at 78, for example. The rim of the cup-like support plate 76 is formed with a spiral corrugation to provide a screw threading to which is attached the upper rim of the filter cup 80. The cup 80 is also formed of sheet metal and is deep drawn to form a housing for a filter assembly 82. An outlet conduit 84 is fitted through the center of the support plate 76 so that an inner end 86 extends within the filter unit 82. The upper end of outlet conduit 84 extends upwardly and outward laterally, as shown in FIGURES 1 and 2, between the two cups 66 and 68 and into contact with the bottom surface of pump housing plate 16. Conduit 84 is metal and may be fixed by solder or brazing at the point where it passes through the plate 76 and also where it contacts the housing plate 16, as indicated at 88, for example.

An inlet fitting 90 (FIGURE 2) is fixed to the side wall of cup 66 leading to the inside of the cup. An inlet valve assembly 92 is press-fitted or spot welded across the inside of cup 66 leading to the pumping chamber 25. The valve unit (FIGURE 4) is formed by a supporting plate 94 having apertures 96 therethrough and supporting a valve stop member 98. A valve washer 100 is positioned between the valve stop 98 and the upper surface of the valve support plate 94. The valve washer 100 extends over the inlet apertures 96 to prevent fuel flow downwardly through the apertures 96 from the pumping chamber 25. A light spring 99 between the under surface of stop member 98 and the upper surface of washer 100 biases washer in position on plate 94. An identical outlet valve assembly 102 is fixed across the inside of cup 68 in a turned-over position from that of valve assembly 92 to provide an outlet valve to the pumping chamber 25. The outlet valve assembly consists of similar parts shown for the inlet valve assembly 92 and includes an outlet valve washer 104. The closed end of cup 68 is apertured and drawn into a collar 106 extending through the filter support plate 76 to provide a fuel passage from the interior of cup 68 into the top of the filter housing support 76.

The filter assembly 82 consists of an outer apertured cylinder 108 made, for example, of fiber board and having a large number of apertures 109 therethrough. A metallic cylinder 110 having apertures 111 therethrough is fixed coaxially within the center of the outer cylinder 108. Between the two cylinders is a paper filter element 112 consisting of a continuous endless strip of filter paper positioned in closely spaced folds between the two cylinders 108 and 110 in the manner indicated in FIGURE 3. A pair of end plates 114 and 116 hold the two cylinders 108 and 110 in their proper spaced relationship with the filter element 112 therebetween. The plates 114 and 116 are sealed to the respective cylinders 108 and 110 so that fuel flowing around the outside of cylinder 108 is forced to pass through the apertures of cylinder 108, through the filter elements 112 and into the hollow space formed by the inside of the apertured cylinder 110. The filter element 82 has a washer 117 fitted through the central aperture of the upper plate 114. This washer fits tightly over the end 86 of the outlet conduit 84 and forms a fuel tight seal between the filter element 82 and the outlet conduit 84.

The filter assembly 82 is replaceable by merely unscrewing the filter supporting cup 80 from the support plate 76 and removing the old filter element 82 from the end 86 of the outlet conduit 84. A new filter unit 82 is slipped onto the end 86 of the outlet conduit 84 and the filter cup 80 is screwed back onto the rim of the support plate 76. A rubber gasket ring 77 is positioned between a flanged portion 79 of support plate 76 and a channeled shoulder portion 81 at the rim of the supporting cup 80. Upon tightening the cup 80 to the support cup 76, gasket 77 is tightly pressed between shoulder 79 and rim 81 to form a fuel tight seal between the support cup 76 and the filter cup 80.

In operation, the upward stroke of diaphragm 22, as viewed in FIGURE 1, causes a low pressure to be formed in the pumping chamber 25. This is reflected in the cup 66 and fuel will be pressed by the atmospheric pressure from a tank 120 through an intake line 122 into the intake nipple 90 leading into cup 66. Fuel is sucked out of the cup 66 through the inlet valve assembly 92 and into the pumping chamber 25. On the downward stroke of rod 30, spring 44 presses the diaphragm downwardly and forces the fuel through the outlet valve assembly 102 into the cup 68 and through passage 106 into the filter assembly 82. Fuel will flow over the top plate 114 and around the sides of the filter assembly 82. Additional fuel flowing into the filter will force the fuel under pressure through the filter 112 and into the hollow center of the filter cylinder 110. Fuel then flows from cylinder 110 through the outlet conduit and the outlet fuel line 124 into a carburetor 126.

Fuel lines 122, 124 and carburetor 126 are schematically shown in FIGURE 1 with the carburetor mounted on the manifold 128 of engine 12. The construction and operation of carburetor 126 is not a part of this invention and thus is not described in detail. However, it may be assumed that the carburetor is of a conventional design and one in which air is pumped through an air filter 130 to mix with the fuel from line 124 within the carburetor 126.

The space within cup 66 between the bottom of the cup and valve assembly 92 provides an inlet chamber 67 to the fuel pump, and in a similar manner the space within cup 68 between the valve assembly 102 and passage 106 forms an outlet chamber 69 to the pumping section. These chambers permit the accumulation of fuel in amounts which make it readily accessible upon the demands of the engine.

Air and fuel vapor passing through the system become trapped in the upper region 115 of the filter supporting plate 76 and above the inlet to conduit 84. This is true since the paper filter element 112, when wet with fuel deters the passage of air therethrough. This trapped air and vapor provides a pulsation dampening air-dome which absorbs the pulsations of the pump and avoids the necessity of the pump on each stroke to move the quantity of fuel accumulated between the outlet valve structure 102 and the carburetor mounted at some distance from the pump, at the instant the valve 102 closes. Without such a dampening or pulse absorbing accumulation of vapor, an undue burden is put upon the pump and diaphragm 22 because of the more solid resistance of fuel in the line between the outlet valve 102 and the carburetor.

The presence of an airdome for air and vapor accumulation in the line provides space into which fuel is forced under pressure on the pumping stroke and which forces the fuel along line 124 to the carburetor on the suction stroke. That is, when the pump is on the suction stroke, valve 102 is in the closed position. Normally, on this stroke there is no movement of liquid downstream of valve 102. With the present structure however, even with valve 102 closed, there is sufficient pressure acting against the fuel by the accumulated air and vapor in space 115, to maintain fuel flow toward the carburetor. The space 115 within the filter eliminates the necessity of providing within the pump outlet chamber 69 additional structure for trapping air to provide a pulse dampening chamber. For example, one type of pump has a diaphragm stretched across a portion of the outlet chamber 69 to form a resilient trapped air space exposed to the fuel within outlet chamber 69. If the pump assembly is used in an upside-down position from that shown in FIGURE 1, the space 117 at the opposite end of cup 80 will trap air for pump dampening.

It is appreciated that the volume of the vapor and air accumulating space may be increased by providing an extension to the lower end of conduit 84. In such instance, the accumulating space defined between plate 76 and conduit inlet 86 is linked.

Carburetor 126 has an inlet valve which, when the carburetor fuel bowl is filled, closes off the inlet line 124 to the carburetor. Since the engine continues to run, the rocker arm 36 will actuate the pumping diaphragm upwardly in an intake stroke. The downward stroke of the diaphragm under the urging of spring 44 will take place only as far as the fuel pressure within the line between the carburetor and fuel pump will permit. That is, on a downward stroke of diaphragm 22, the inlet valve 100 will close off the inlet line 122 and since fuel is also blocked in its flow to the carburetor, fuel pressure within the pumping chamber 25 will retain the diaphragm in an upward position, as viewed in FIGURE 1, and keep the spring 44 under tension. The forked end 34 of the lever 36 permits the oscillating movement of lever 36 to continue without affecting the pump until the carburetor inlet valve opens and the fuel pressure in the pump chamber released.

The fuel pump and filter assembly described is one which is made from easily formed and fabricated metal parts. These parts are those which are assembled by soldering, brazing, welding, or any desired and well known procedure. The thinness of the metal allows the fuel passing through both the pump and the filter portions of the assembly to be exposed to the cooling effect of ambient air. During the operation of the motor vehicle air will flow around the engine and the pump assembly to provide this cooling effect to the fuel in this pump and filter assembly.

The transverse dimension of the pump assembly is determined by that of casting 14. As pointed out above, this is kept to a minimum by omitting the use of screws through flange 20. This is a decided advantage where space in the engine compartment of the vehicle is at a premium. Thus, a pump having a greater capacity can be used in any given space.

Heat transfer through the sheet metal plate 16 and cups 66 and 68 is much greater than if these parts were formed of cast metal several times thicker, even though the cast metal were an aluminum alloy having a greater heat conductivity. The pump plate 16, cups 66 and 68, as well as the filter housing parts 76 and 80, are all exposed to the cooling effect of ambient air moving over the surfaces of these parts due to the movement of the vehicle or the fan 132 of the engine. Thus, the fuel pump is maintained at a lower temperature which minimizes vapor lock conditions. Such conditions exist when the engine is shut off for a period of time after a hot run. The heat of the engine builds up and by conduction and radiation heats the fuel in the fuel lines and the pump. Upon starting the engine, however, the flow of air past the pump quickly cools the pump parts to a lower temperature and reduces the vapor conditions in this part of the fuel system.

The thickness of the sheet metal pump and filter structures have been given above as being in the order of 0.030". However, the thickness need only to be sufficient to provide the required structural strength and rigidity for proper pump and filter operation. Such a thickness with sheet steel, for example, may range from 0.010" to 0.0625". Sheet metal of this thickness provides a greater cooling effect and pumps fabricated in the manner described operate at lower temperatures than those made from thicker castings and with the described advantages. It would also be within the scope of this invention to form the pump spring housing 14 of sheet metal.

It is clear from the foregoing that the described pump and filter combination provides an inexpensive novel fuel handling element capable of overcoming or minimizing vapor lock in a fuel system. There is not only provided optimum heat dissipation from the fuel in the pump itself, but also a pressurized portion for smoothing the otherwise sporadic pulsations delivered to the carburetor. The instant arrangement for pulse dampening is not only relatively simple, but it avoids the use of alternate dampening means which might comprise the addition of parts inserted within the pump body thereby increasing the cost and complicating the pump structure.

It is appreciated that the foregoing description discloses a preferred embodiment of the invention which might be altered in certain details without departing from the spirit and scope thereof as defined in the appended claims.

I claim:
1. A pump for vaporizable fuel comprising; a spring housing having a peripheral flange defining an opening, a pump housing including a plate attached to said peripheral flange, a diaphragm disposed across said spring housing opening and being sealably held at said peripheral flange to define a pumping chamber in said pump housing adjacent said plate, actuating means pivotably engaging said spring housing and being operably connected to said diaphragm for reciprocably moving the latter in said pumping chamber, a plurality of elongated thin walled cup members depending from said pump housing plate in a generally parallel direction, said cup members being spaced from each other to allow the passage of air thereabout, each of said cup members having an open end thereof communicated with said pumping chamber, one of said cup members having fuel inlet means, a check valve disposed in each of said elongated cup members and being operable to provide a unidirectional flow of fluid through said pump chamber in response to reciprocatory movement of said diaphragm, a filter support structure including a plate depending from at least one of said elongated cup members and being spaced from said pump housing to expose the respective spaced cup members to said passage of air thereabout, and having a circular rim on said filter support plate, discharge means including a conduit carried in said filter support structure having an inlet opening disposed inwardly of said circular rim and an outlet disposed adjacent said respective elongated cup members, passage means in said filter support structure communicating the latter with at least one of said elongated members to receive fuel therefrom, a filter assembly carried on said filter support structure and including a filter cup sealably engaging said circular rim and defining a closed filter compartment, a cylindrical filter unit positioned in said filter cup and including an outlet port engaging said discharge means providing communication with the latter, said filter unit having an end wall disposed adjacent to said plate of said filter support structure and defining a space therebetween for accumulating air and vapors of said vaporized fuel.

2. In a pump as defined in claim 1 including a washer carried in said end wall of said filter unit and engaging said discharge means inlet opening to form a fuel tight seal.

3. In a pump as defined in claim 1 wherein said filter support structure plate includes a depression formed therein conforming substantially to the ends of said respective cup members.

4. In a pump as defined in claim 1 wherein said respective elongated cup members extend a substantially equal distance from said pump housing and are fused to said filter support structure.

5. In a pump as defined in claim 1 wherein said discharge means conduit is disposed intermediate said respective elongated cups.

6. In a pump as defined in claim 1 wherein said outlet in said discharge means conduit is disposed intermediate said respective elongated cups and extends in a direction radially outward from the latter.

7. In a pump as defined in claim 1 wherein said filter cup includes an end wall spaced remotely from said filter support structure and said cylindrical filter unit being spaced from said cup end wall to form a vapor accumulating space when said pump is operated in an inverted position.

References Cited by the Examiner
UNITED STATES PATENTS

| | | | |
|---|---|---|---|
| 1,789,611 | 1/1931 | Van Ranst | 210—416 X |
| 1,932,676 | 10/1933 | Rockwell | 210—416 |
| 2,842,267 | 7/1958 | Shire | 210—416 |
| 2,969,745 | 1/1961 | Johnson | 103—150 X |
| 2,979,208 | 4/1961 | Humbert. | |
| 3,000,506 | 9/1961 | Hultgren. | |
| 3,096,722 | 7/1963 | Fitzgerald et al. | 103—150 |
| 3,150,601 | 9/1964 | Smith et al. | 103—150 |
| 3,161,142 | 12/1964 | Reitz | 103—150 |
| 3,198,128 | 8/1965 | Smith. | |

REUBEN FRIEDMAN, *Primary Examiner.*

D. M. RIESS, *Assistant Examiner.*